(12) United States Patent
Erden (10) Patent No.: US 12,518,780 B2
(45) Date of Patent: Jan. 6, 2026

(54) SINGLE TRACK ISOLATION IN STAGGERED BITS MAGNETIC RECORDING

(71) Applicant: Seagate Technology LLC, Fremont, CA (US)

(72) Inventor: Mehmet Fatih Erden, St. Louis Park, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/923,954

(22) Filed: Oct. 23, 2024

(65) Prior Publication Data

US 2025/0259646 A1    Aug. 14, 2025

Related U.S. Application Data

(60) Provisional application No. 63/552,808, filed on Feb. 13, 2024.

(51) Int. Cl.
| | | |
|---|---|---|
| *G11B 5/012* | (2006.01) | |
| *G11B 5/02* | (2006.01) | |
| *G11B 5/09* | (2006.01) | |
| *G11B 20/12* | (2006.01) | |

(52) U.S. Cl.
CPC ............... *G11B 5/02* (2013.01); *G11B 5/09* (2013.01); *G11B 20/1217* (2013.01); *G11B 2020/1238* (2013.01)

(58) Field of Classification Search
CPC ........ G11B 20/1217; G11B 2020/1238; G11B 5/59655; G11B 5/59688; G11B 19/16; G11B 27/34; G11B 5/012; G11B 5/00; G11B 15/06; G11B 5/58; G11B 5/54
USPC ....................................................... 369/75, 48
See application file for complete search history.

(56) References Cited

U.S. PATENT DOCUMENTS

| | | | |
|---|---|---|---|
| 8,035,910 B2 | 10/2011 | Mallary | |
| 8,786,969 B2 * | 7/2014 | Kasiraj | .................. G11B 5/746 360/39 |
| 8,786,970 B2 | 7/2014 | Erden | |
| 8,922,923 B2 * | 12/2014 | Steiner | ............. G11B 20/10509 360/32 |
| 9,570,104 B1 | 2/2017 | Erden | |
| 10,255,945 B1 | 4/2019 | Erden | |

* cited by examiner

*Primary Examiner* — Nabil Z Hindi
(74) *Attorney, Agent, or Firm* — Mueting Raasch Group (57) ABSTRACT

Disclosed are storage devices and methods relating to reading staggered bits recording patterns in which the data bits on adjacent tracks recorded on magnetic media are staggered in such a way that a single reader detects a combined signal from data bits on multiple tracks at selected signal sampling locations. A signal shaping algorithm is used to deconvolve the combine signals, thus isolating each of the tracks from one another so that single track bit sequences can be decoded. In this way, staggered bits patterns can use inter-track interference effects for advantage, allowing readers to read multiple bit tracks simultaneously and without ambiguity.

20 Claims, 5 Drawing Sheets

SINGLE TRACK ISOLATION IN STAGGERED BITS MAGNETIC RECORDING

RELATED APPLICATION

This application claims priority to U.S. Provisional Patent Application 63/552,808 filed on Feb. 13, 2024, entitled "Staggered Bits Magnetic Recording," the entire contents of which are hereby incorporated by reference.

TECHNICAL FIELD

The disclosure relates to reading data from magnetic media recorded using staggered bits magnetic recording techniques.

SUMMARY

In accordance with certain aspects, the present disclosure describes methods for reading bits recorded on magnetic media according to a staggered bits recording pattern having tracks of bits, the bits of each track being staggered relative to the bits of adjacent tracks. Such methods include reading a combined signal from two or more adjacent tracks of bits, the combined signal being read at each of a plurality of sampling locations along the tracks. Such methods further include isolating one of the two or more adjacent tracks using a signal shaping algorithm selected for the plurality of sampling locations, and decoding the bits of the isolated track.

In certain aspects, reading a combined signal involves reading a combined signal from two adjacent tracks of bits, the bits on adjacent tracks being arranged such that each border between two adjacent bits on the same first track is positioned at or near a center position of a bit in a down-track direction on an adjacent second track.

In certain aspects, the sampling locations are evenly distributed in the down-track direction and positioned at the center position of each bit on the two adjacent tracks of bits. In certain aspects, when adjacent bits on the isolated track are numbered according to a numbering convention $B_{k-2}$, $B_k$, $B_{k+2}$, and so on, the signal shaping algorithm produces an isolated track signal equal to $(2B_k-(B_{k+2}+B_{k-2}))/4$.

In certain aspects, the sampling locations are evenly distributed in the down-track direction and positioned midway between each border between two adjacent bits on the first track and each border between two adjacent bits on the second track. In certain aspects, when adjacent bits on the isolated track are numbered according to a numbering convention $B_{k-2}$, $B_k$, $B_{k+2}$, and so on, the signal shaping algorithm produces an isolated track signal equal to $(B_k-B_{k-2})/2$.

In certain aspects, each of the bits has a bit aspect ratio of about 1:1.

In certain aspects, decoding the bits of the isolated track involves using information gathered from one or more tracks adjacent to the isolated track.

In certain aspects, the step of reading a combined signal is performed by a first reader that reads a first combined signal from a first set of two or more adjacent tracks and by a second reader that reads a second combined signal from a second set of two or more adjacent tracks, and wherein the isolated track is from the first set of two or more adjacent tracks. In certain aspects, at least one of the tracks of the first set of two or more adjacent tracks is adjacent to at least one of the tracks of the second set of two or more adjacent tracks, and wherein signals gathered by the second reader are used during decoding the bits of the isolated track from the first set of two or more adjacent tracks. In certain aspects, how signals gathered by the second reader are used during decoding the bits of the isolated track depends on positioning of the first reader and the second reader relative to the magnetic media.

In accordance with various aspects, the present disclosure also describes hard disk drives that employ a staggered bits magnetic recording architecture. Such hard disk drives include magnetic recording media having a staggered bits pattern that includes a first track having a first sequence of data bits and a second track having a second sequence of data bits, the second track being adjacent to the first track and the second sequence of data bits being staggered relative to the first sequence of data bits. Such hard disk drives further include a reader having an effective cross-track reader width extending across at least the first track and the second track, the reader aligned to read a combined signal at a plurality of sampling locations along the first track and the second track, the sampling locations selected to facilitate isolation of a single track. Moreover, such hard disk drives include a read channel coupled to the reader and configured to isolate at least one of the first track and the second track using a signal shaping algorithm selected for the plurality of sampling locations, and to decode the data bits of the isolated one of the first track and the second track. In certain aspects, each of the data bits has a bit aspect ratio of about 1:1.

In certain aspects, such hard disk drives further include a secondary reader spaced apart from the reader in a down-track direction, and wherein the read channel is configured to use signals gathered by the secondary reader to decode the data bits of the isolated one of the first track and the second track. In certain aspects, how signals gathered by the secondary reader are used to decode the data bits of the isolated one of the first track and the second track depends on positioning of the reader and the secondary reader relative to the magnetic recording media.

In certain aspects, the reader has a uniform read detection sensitivity over the entire effective cross-track reader width.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The present disclosure relates to reading staggered bits recording patterns in which the data bits on adjacent tracks recorded on magnetic media are staggered in such a way that a single reader detects a combined signal from data bits on multiple tracks at selected signal sampling locations. As the tracks are advanced under the reader, a sequence of combined bit signals from the sampling locations is thereby generated. A signal shaping algorithm may be applied that effectively isolates each of the tracks from one another so that single track bit sequences can be decoded. In this way, staggered bits patterns can use intertrack interference effects for advantage, allowing readers to read multiple bit tracks simultaneously and without ambiguity. Staggered bits recording patterns also allow for the recording of data bits having a bit aspect ratio close to 1:1 while maintaining, or even improving, areal density capability (ADC).

In a conventional hard disk drive (HDD) storage system, the HDD receives a data file to be stored, divides the data file into pieces called sectors, encodes each sector, and writes the encoded sectors onto magnetic storage media using a write head. To retrieve the data file, a reader (or read transducer) reads the sectors as a set of signals that are conditioned and decoded to reconstitute the file in a format suitable for the host or user. The data bits that make up the sectors are written onto tracks defined on the magnetic media surface. By convention, the aspect ratio of a data bit (bit aspect ratio, or BAR) is defined by the width of the tracks (measured in the cross-track direction) divided by the length of the data bit (measured in the down-track direction). Increasing the storage capacity involves squeezing more data bits into the same area on the magnetic media, which can be accomplished by increasing the number of tracks per inch, or TPI (thus decreasing the track width), and/or by increasing the bits per inch, or BPI (thus decreasing the bit length). The overall areal density capability (ADC) is thus equal to TPI multiplied by BPI.

For a given reader design having a fixed cross-track width, the width of the data tracks cannot be conventionally reduced without introducing intertrack interference (ITI). In other words, track widths narrower than the effective reader width will result in the reader picking up signal from adjacent tracks. ITI is considered noise that must be filtered out, usually at the cost of additional data channel processing overhead, more complicated data channel architectures, the loss of data level resolution, and/or the use of one or more additional readers or multiple passes by the same reader. As such, in conventional data bit layouts, the reader width dictates the track width. Thus, the only conventional degree of freedom for increasing ADC is decreasing the bit length without decreasing the track width. This necessarily increases the BAR. However, for granular magnetic recording media, the bit length can only be reduced so far until being limited by the average grain size of the media. Bit lengths that approach the average grain size can lead to unstable data bits when attempting to write and retain data, and to greatly increased noise when attempting to read data.

Staggered bits magnetic recording can be used to reduce track widths below the reader width and to thereby reduce bit aspect ratios while retaining data level resolution and preserving or increasing areal density capability. In accordance with various aspects of the present disclosure, the combining of signals across adjacent tracks, which would conventionally result in undesired intertrack interference, is used to shape the signals to thereby isolate the individual tracks in a way that may improve the signal-to-noise ratio (SNR). By staggering the bits on adjacent tracks, bits from both tracks can be simultaneously sampled by the reader without losing any information because the next pair of bits that are sampled will include one of the bits from the previous sample. As will be set forth in more detail in the discussion that follows, this allows each track to be isolated so that the data bit sequence can be unambiguously resolved in a track-by-track fashion.

Staggered bits recording patterns can be written onto granular magnetic media using any desired recording scheme, whether random or sequential, and whether via conventional magnetic recording (CMR), shingled magnetic recording (SMR), or interlaced magnetic recording (IMR) schemes. In SMR, tracks are written in a way that overlays a portion of a previously written adjacent track, reminiscent of installing shingles on a roof. In this way, the tracks are recorded as easy-to-write wide tracks, and the act of writing the next track partially over-writes the previous track, reducing the effective track width. SMR and IMR recording schemes generally necessitate arranging the data bits in a way that facilitates sequential writing. In CMR, data can be written randomly or sequentially.

Regardless of the recording scheme used to write a staggered bits pattern, in accordance with the present disclosure the reader reads a combined signal from multiple adjacent tracks (for example two adjacent tracks), and this combined signal is shaped in a manner that isolates the contributions of the bits from only one of the tracks. In this way, each track may be isolated and decoded apart from the other track(s). The shaping algorithms take advantage of the intertrack signal contributions, which therefore contribute to the signal when reading staggered bits patterns rather than act as a source of noise as with conventional data recording patterns. The combined signal produced by the reader reading the adjacent tracks is transmitted to the read channel architecture, which shapes the combined signal in a manner that isolates the individual tracks and processes the isolated track information to detect the independently coded sectors in those tracks. The sectors detected from a given track of interest are then sent to the channel code to recover the user data.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

Figure 1:
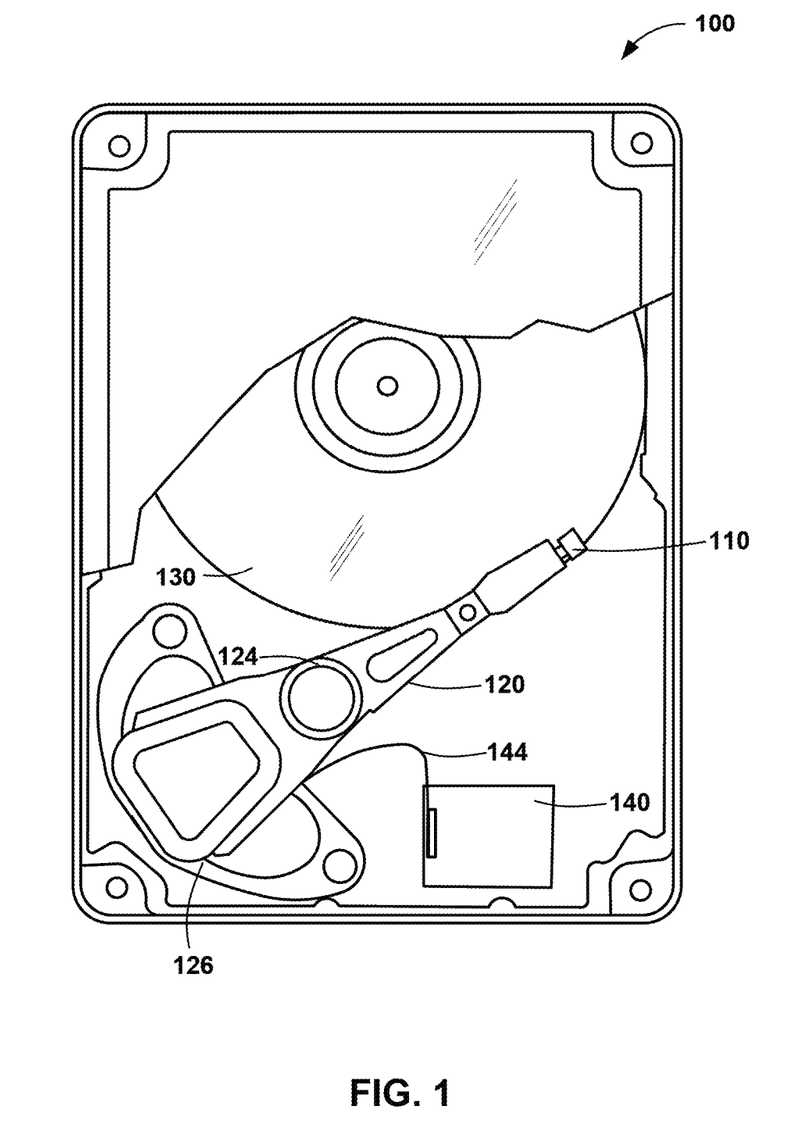
FIG. 1 is a schematic representation of a hard disk drive as may be used with various aspects of the present disclosure.

FIG. 1 schematically depicts a typical HDD device 100 that includes a slider 110 disposed on the end of an actuator arm 120 that is rotationally movable around a pivot 124 by use of a voice coil motor 126. The slider 110 is positioned in close proximity to the surface of magnetic media disk 130, and includes a writer for writing data bits in tracks on the media 130 and a reader for reading data bits from tracks on the media 130 as the media spins by action of a spindle motor (not shown). HDD device 100 can operate on any magnetic recording principle, whether that be conventional magnetic recording (CMR), shingled magnetic recording (SMR), heat-assisted magnetic recording (HAMR), or any other type of recording technique and combinations thereof.

While the actuator 120 is shown to move rotationally, the present disclosure is not limited to how the actuator moves and encompasses linear actuation. Likewise, readers and writers such as provided on slider 110 can be provided on movable or stationary rails, or in any other suitable manner now know or later contemplated.

Controller electronics 140 may be coupled to the voice coil motor 126 and slider 110 via a flex cable 144 that connects to traces on the actuator 120. Preamp electronics (not indicated) are typically disposed close to the slider 110 for conditioning signals to the writer and from the reader. The preamp forms part of a read channel that applies signal shaping and track isolation in accordance with the present disclosure as well as applying error correction and other signal conditioning. The read channel may be instantiated by electronics on or near the slider 110 and/or provided as part of the controller electronics 140. Controller electronics 140 may also be coupled to a spindle motor to thereby control the spinning of the media disk(s) 130 along with the movement of the actuator 120 and the reading and writing of data. A host device may communicate with HDD 100 through a standardized interface (not shown).

In accordance with the present disclosure, magnetic media 130 may be a granular magnetic media, meaning that the magnetic recording layer is characterized by a random distribution of somewhat closely packed crystalline and poly-crystalline grains of material, often of roughly similar size. The grains of the magnetic recording layer may be composed of any suitable material, for example an iron-platinum alloy (FePt) or other alloys such as NdFeB or various cobalt-based alloys that may include nickel, chromium, phosphorous, and/or other materials. It will be appreciated that various aspects of the present disclosure can be realized utilizing different media materials and grain structure characteristics including grain size and shape, grain distribution and packing density, grain property anisotropy, and so forth. It will be appreciated that staggered bits recording can be utilized with media that exhibits a highly random grain structure as well as a more ordered grain structure, as well as with patterned media. When using staggered bits recording with ordered or patterned media, the bits staggering may be incorporated within the design of the media, for example by staggering the grain locations in bit patterned media as desired at each media zone.

Figure 2A:
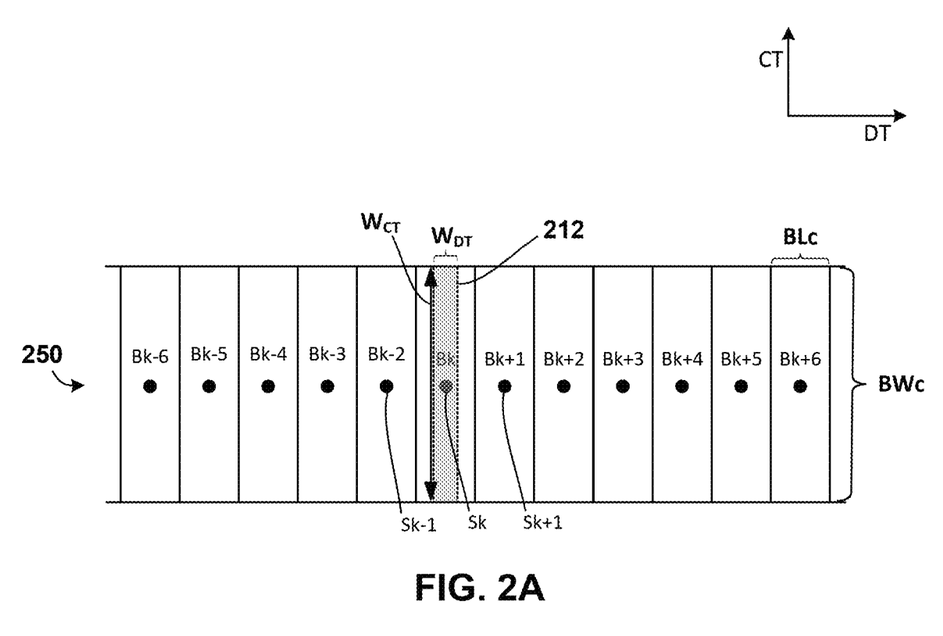
FIG. 2A is a schematic representation of a conventionally recorded track of data bits.

$B_{k-2}$, $B_k$, $B_{k+2}$,

To help illustrate signal shaping when reading staggered bits patterns in accordance with the present disclosure, FIG. 2A shows an example of a conventional track 250 of data bits, with a reader 212 being positioned over data bit $B_k$. The down-track (DT) and cross-track (CT) directions are indicated by axes. By convention, data bits that are down-track from data bit $B_k$ are denoted $B_{k+1}$, $B_{k+2}$, and so forth, and data bits that are up-track from $B_k$ are denoted $B_{k-1}$, $B_{k-2}$, and so forth. Each data bit has a width BWc in the cross-track direction and a length BLc in the down-track direction. Typically, BWc may be around 4 times or more that of BLc, giving a BAR of 4:1 or more. The reader has a fixed cross-track width of Wct and a fixed down-track width of Wdt. The bit width BWc is designed to coincide with the cross-track reader width Wct, thereby helping to minimize the effects of intertrack interference that would occur if BWc was smaller than Wct, and helping to maximize the TPI (tracks per inch) by not making the bits wider than necessary.

In the case of reading conventional bits in which the bits have roughly the same width as the cross-track width of the reader and the bits are longer than the down-track width of the reader, the reader 212 can read the signal from a single bit, such as $B_k$, when the reader 212 is positioned at the sampling location for a given bit, such as sampling location $S_k$ for bit $B_k$, sampling location $S_{k+1}$ for bit $B_{k+1}$, and so forth. As such, each sampling instance targets the bit at that instance, and hence the relationship between the sampling signal and the bit signal can be written as $S_k=B_k$. A given signal sample may include interference from adjacent bits within the same track (that is, an up-track bit or a down-track bit) depending on the reader resolution and the location of the sampling. This is called inter-symbol interference (ISI).

Figure 2B:
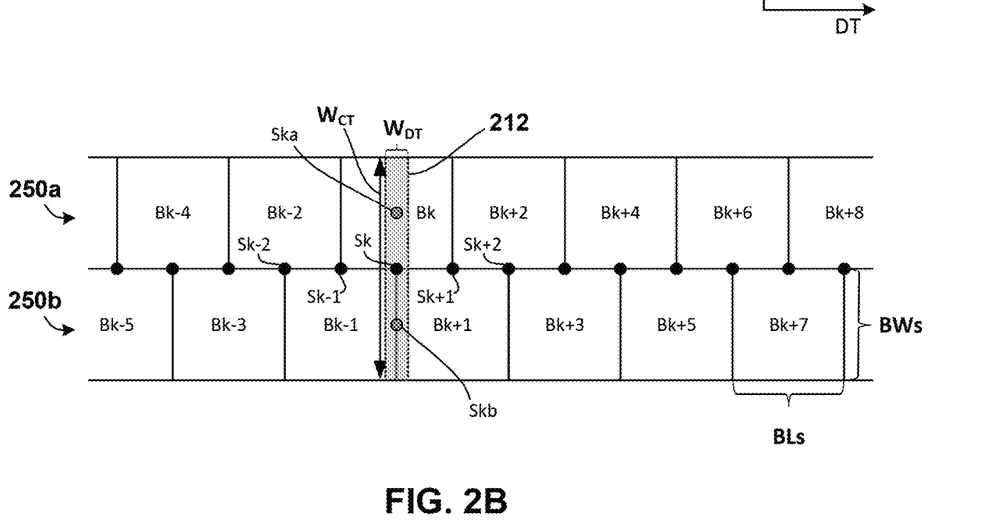
FIGS. 2B and 2C are schematic representations of the reading of tracks of data bits arranged in a staggered bits pattern in accordance with aspects of the present disclosure.
Figure 2C:
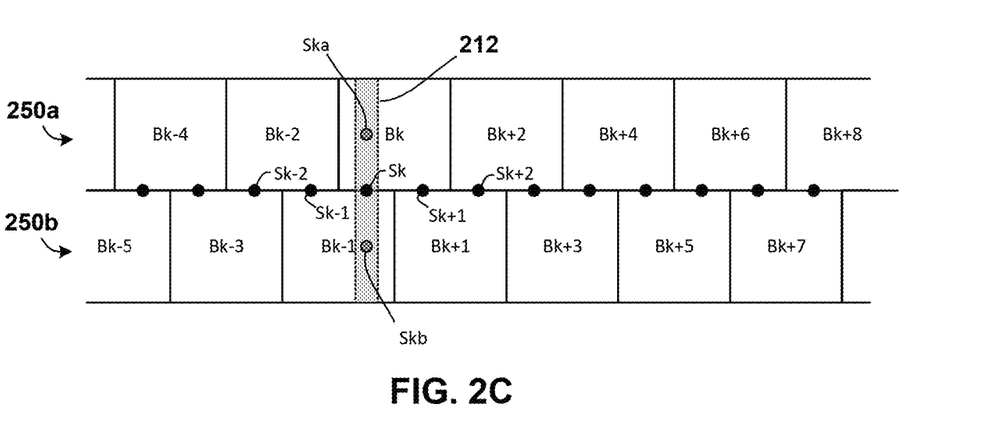

FIGS. 2B and 2C show examples of signal sampling of data bits arranged in a staggered bits pattern. FIGS. 2B and 2C show two adjacent data tracks 250a and 250b having their respective data bits arranged in a staggered fashion relative to one another. In this case, each bit has BAR of 1:1 such that the bit width BWs is equal to the bit length BLs. The bits constituting track 250a are arranged so that the transition between bits of track 250a occurs in the middle of the down-track span of the adjacent bit of track 250b. By convention, the bits are numbered in a zig-zag pattern going back and forth from track to track such that if bit $B_k$ is on data track 250a, then bit $B_{k+1}$ is the next adjacent bit on data track 250b in the down-track direction, and bit $B_{k-1}$ is the next adjacent bit on data track 250b in the up-track direction. The result of this numbering convention is that all even numbered bits reside on track 250a and all odd numbered bits reside on track 250b. While this numbering convention is convenient when discussing signal shaping in accordance with the present disclosure, it will be recognized that any numbering convention can be used. Reader 212 has a down-track width Wdt that is preferably less than about half of the bit length BLs and a cross-track width Wct that is about equal to twice the bit width BWs so that two adjacent tracks can be read at the same time. In embodiments where three adjacent staggered tracks are to be read at the same time, the bit width may be set at one third of the cross-track reader width.

Referring specifically to FIG. 2B, there is shown an instance where the sampling locations $S_{k-2}$, $S_{k-1}$, $S_k$, $S_{k+1}$, $S_{k+2}$, and so forth are selected to correspond to the center of a bit on one track and at the border of two bits on the adjacent track. By convention, the numbering of the sampling instance corresponds to the numbering of the bit centered on the sampling location, so that sampling location $S_k$ means the reader 212 is positioned at or near the center of data bit $B_k$ in the down-track direction. When reader 212 is positioned at sampling location $S_k$, the signal being read will be a combination of a contribution from upper track 250a, which is denoted $S_k a$, and a contribution from lower track 250b, which is denoted $S_k b$. The signal read by reader 212 is therefore $S_k=0.5S_k a+0.5S_k b$, and since $S_k a$ is at the center of bit $B_k$ and $S_k b$ straddles bits $B_{k-1}$ and $B_{k-2}$, the signal stated in terms of bit states is $S_k=0.5B_k+0.5(0.5B_{k-1}+0.5B_{k+1})$, or $0.25B_{k-1}+0.5B_k+0.25B_{k+1}$.

Referring now to FIG. 2C, there is shown an example of a different sampling instance where the sampling locations $S_{k-2}$, $S_{k-1}$, $S_k$, $S_{k+1}$, $S_{k+2}$, and so forth are selected to correspond to a point in the down-track direction that is half way between the border between two bits in the top track 250a and the border between two bits in the bottom track 250b. For example, sampling location $S_k$ is located half way between the border between bits $B_{k-2}$ and $B_k$ on track 250a and the border between bits $B_{k-1}$ and $B_{k+1}$ on track 250b. In this way, the sampling contribution $S_k a$ from the top track 250a can be considered to correspond to the state of bit $B_k$, and the sampling contribution $S_k b$ from the top track 250b can be considered to correspond to the state of bit $B_{k-1}$. The signal read by reader 212 positioned at sampling location $S_k$ is therefore $S_k=0.5S_k a+0.5S_k b$, which is $S_k=0.5B_k+0.5B_{k-1}$.

It will be appreciated that there may be sampling instances other than those illustrated in FIGS. 2B and 2C that can be used and that may depend on the exact arrangement of staggered bits, the number of tracks to be read at the same time, the BAR of the bits, and so forth. As can be seen from FIGS. 2B and 2C, reading tracks in staggered bits magnetic recording schemes implicitly involves detected signal contributions from bits from each track regardless of sample location. In accordance with the present disclosure, signal shaping may be used to isolate the signal contributions from bits only in a single track, thereby isolating that track. In the case of reading two staggered tracks at the same time, either track can be isolated using the same signal. As such, when bits are arranged in a staggered bits pattern, multiple adjacent tracks can be read together and from the read signal can be independently isolated to decode each data track separately.

In the case of FIG. 2B where the sampling instance $S_k$ was chosen to be at the center of bit Bk, the following signal shaping algorithm may be used to isolate the tracks. For a given series of three sampling instances, such as $S_{k-1}$, $S_k$, $S_{k+1}$, add the difference between $S_k$ and $S_{k-1}$ to the difference between $S_k$ and $S_{k+1}$, thus arriving at a shaped signal $U_k=(S_k-S_{k-1})+(S_k-S_{k+1})=2S_k-(S_{k-1}+S_{k+1})$. By substituting the bit state contributions into the sampling instances, the shaped signal becomes:

$$U_k = (2B_k - (B_{k+2} + B_{k-2}))/4; \text{ and}$$

$$U_{k+1} = (2B_{k+1} - (B_{k+3} + B_{k-1}))/4.$$

As can be seen, the shaped signal $U_k$ includes contributions only from bits in the top track 250a, and the shaped signal $U_{k+1}$ includes contributions only from bits in the bottom track 250b. Upon resolving any of the bits within a given track, the shaped signal that isolates that track can be applied to resolve all the bits in the track.

In the case of FIG. 2C where the sampling instance $S_k$ was chosen to be half way between the border between bits on one track and the border between bits on the adjacent track, the following signal shaping algorithm may be used to isolate the tracks. For a given series of two sampling instances, such as $S_{k-1}$, $S_k$, subtract $S_{k-1}$ from $S_k$, thus arriving at a shaped signal $V_k=S_k-S_{k-1}$. By substituting the bit state contributions into the sampling instances, the shaped signal becomes:

$$V_k = (B_k - B_{k-2})/2; \text{ and}$$

$$V_{k+1} = (B_{k+1} - B_{k-2})/2.$$

As can be seen, the shaped signal $V_k$ includes contributions only from bits in the top track 250a, and the shaped signal $V_{k+1}$ includes contributions only from bits in the bottom track 250b. Upon resolving any of the bits within a given track, the shaped signal that isolates that track can be applied to resolve all the bits in the track.

Given the examples of FIGS. 2B and 2C, it will be appreciated that, for a given sampling location, there is a signal shaping that combines the signal instances in a way that isolates bits on each track separately. This allows the bit writing and reading in staggered bits magnetic recording schemes to be focused on single tracks even though the track widths are much smaller than the reader widths, thus allowing low BAR values down to 1:1 or even lower. Bit lengths on each isolated track in staggered bits magnetic recording may be longer than bit lengths used in conventional recording at the same ADC. This leads to healthy signal quality at the output of the shaping algorithm. Any ISI in the system then can be visualized as added on top of the output of the shaping algorithm rather than to each bit. However, it should be noted that since the bit lengths on each isolated track will generally be longer in staggered bits magnetic recording than for more conventional recording at the same ADC, the system ISI effects will be less in staggered bits magnetic recording.

Signal shaping in accordance with the present disclosure such as illustrated in relation to FIGS. 2B and 2C can provide additional advantages over single-track reading. In isolating each track of a staggered bits pattern, the shaping algorithms can produce signals for which the SNR is better optimized than for single-track reading. For a sequence of bits along a track that has bit states that do not change (that is, a run of +bit states or a run of −bit states) the shaping function becomes 0 over that sequence, whereas for a sequence of bits that alternates between states the shaping function is at a maximum. This may be desirable because it matches the noise spectrum observed in magnetic recording. More specifically, noise is minimum when there is no transition between consecutive bits written on the same track, whereas noise is at a maximum when there are transitions between consecutive bits written on the same track. As such, the shaping algorithms for isolating individual tracks in staggered bits magnetic recording produce a lower signal when the noise is lowest and produce a higher signal when the noise is the highest. This situation is unlike conventional recording where minimum signal and maximum noise both occur when consecutive bits transition between different states. As a result, utilizing signal shaping in reading staggered bits patterns may lead to improved and more consistent SNR, which may in turn reduce the need for extra error code redundancies and lead to potentially better code efficiency and higher ADC.

In the various discussions above, it is assumed that an ideal reader is utilized, that is a reader that has uniform detection sensitivity across the span of the reader. It will be appreciated that the same or similar methodologies and techniques may be employed for use with readers having a designed or well-characterized detection sensitivity anisotropy across the span of the reader. Moreover, for purposes of illustration, staggered bits recording patterns have heretofore been described as encompassing two adjacent tracks. However, it will be appreciated that staggered bits recording in accordance with the present disclosure can be implemented using more than two adjacent tracks.

Figure 3:
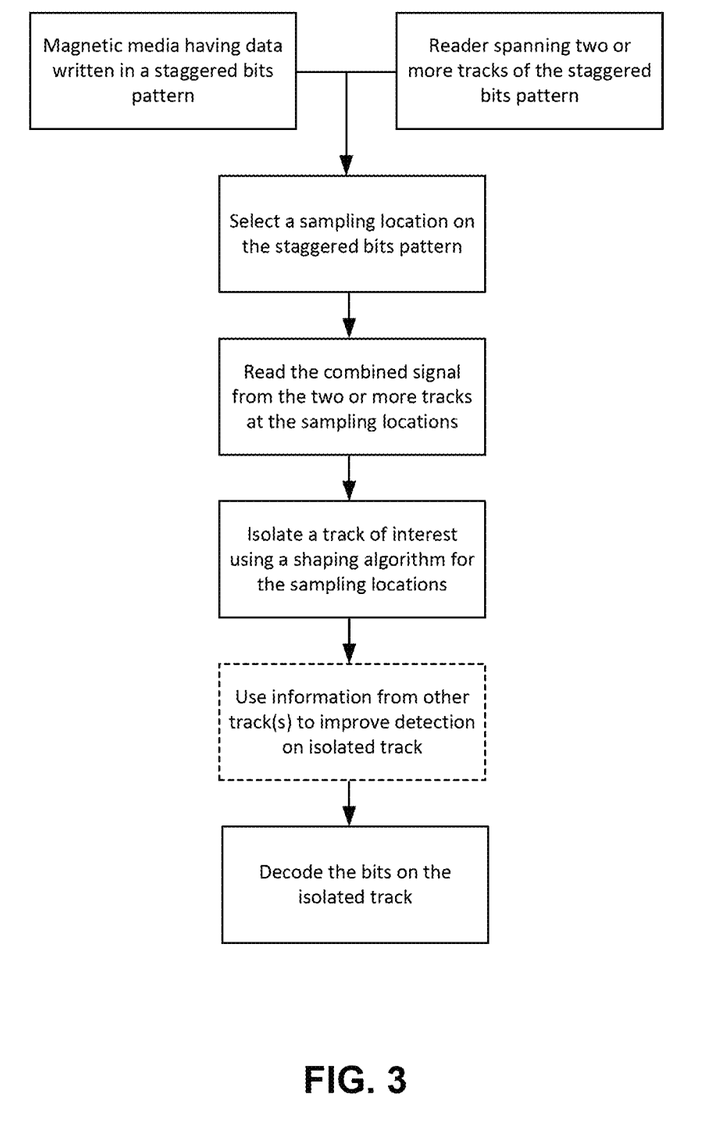
FIG. 3 is a flow chart showing steps that may be used in reading isolated data tracks from data bits arranged in a staggered bits pattern in accordance with aspects of the present disclosure.

FIG. 3 shows a generalized flow chart of steps that may be used in conjunction with systems and methods in accordance with the present disclosure. In an HDD system that includes data written in a staggered bits pattern on rotating magnetic media, a reader that spans two or more of the tracks of the staggered bits patter is used to read the combined signal of two or more data tracks. The read signal is acquired at sampling locations at regular intervals. It is well-known in the art of hard disk drive storage that the sampling location can be determined by selecting and utilizing desired phase-locked loop (PLL) fields in a timing recovery algorithm implemented in a read-channel architecture. The choice of sampling location will generally affect the shaping algorithm that is used to isolate one track from another. Upon isolating a track of interest, information gathered from other tracks (or information gathered from the same track using a different reader) may optionally be used to improve the signal from the isolated track. Thereafter, the bit sequence on the isolated track may be decoded and produced.

Figure 4:
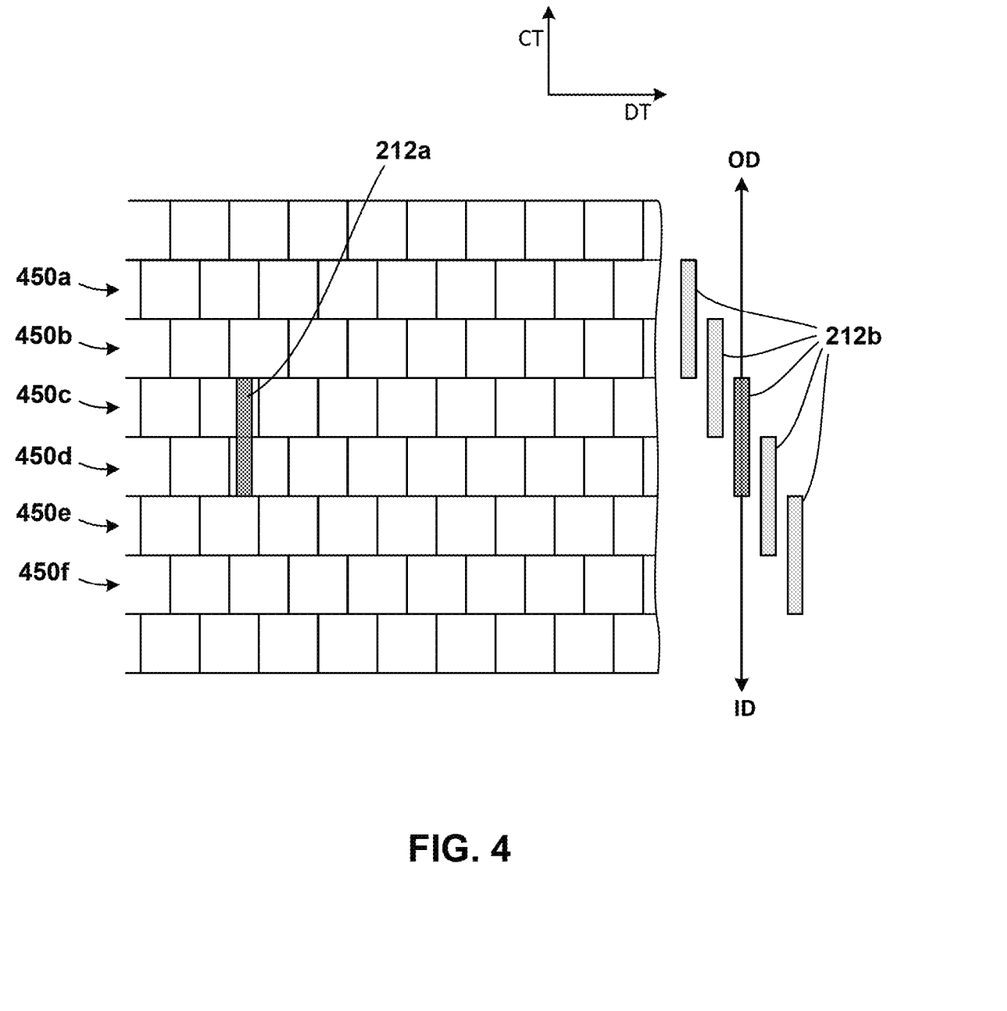
FIG. 4 is a schematic representation of reading a staggered bits pattern using multiple readers in accordance with certain aspects of the present disclosure.

FIG. 4 schematically shows multiple tracks, including tracks 450a-450f, that are arranged with their bits in a staggered bits pattern. The cross-track (CT) and down-track (DT) directions are indicated by the axes. FIG. 4 is meant to illustrate aspects of the present disclosure in a multiple reader configuration. A first reader 212a is positioned to simultaneously read tracks 450c and 450d. Due to the skew created by the arc-shaped movement of a recording head at the end of a typical HDD actuator, the position of a second reader 212b relative to the tracks being read by the first reader 212a will depend on whether the recording head is nearer to the outer diameter (OD) of the media disk, nearer to the inner diameter (ID) of the media disk, or somewhere in between. As illustrated in FIG. 4, when the recording head is closer to the OD, the second reader 212bmay be aligned with tracks 450a and 450b when the first reader 212a is aligned with tracks 450c and 450d.

As the recording head moves toward the middle of the media disk, the effect of skew moves the second reader 212b into closer alignment with first reader 212a with respect to the track orientation. As the recording head moves away from the middle of the media disk and toward the ID, the effect of skew moves the second reader 212b out of alignment with first reader 212a with respect to the track orientation. While the range of track misalignment realized between the first and second readers as the head is moved from the OD to the ID can vary depending on configuration, for a disk drive operating at full stroke, having a TPI of about 1000 to 2000, and having a spacing between the first and second readers in the down-track dimension of about 90 nm, it can be expected that the second reader will vary in track misalignment from OD to ID in a manner similar to what is illustrated in FIG. 4.

Recognizing the relative track positioning between the first and second reader can be used for advantage when reading and isolating tracks of staggered bits. At the middle diameter (MD), the first reader 212a and second reader 212b are aligned with the same tracks 450c and 450d. In this case, both the first and second readers may be used to read the same tracks, with information from each reader being usable to improve or verify the detection of the bits using the other reader. Employing the sampling and shaping techniques set forth in the present disclosure, a track of interest may be isolated using either or both of the signals produced by the first and second reader, with information from one reader being usable to improve the bit detection of the other.

At the extremes when the recording head is near the OD or near the ID, signal from the second reader may be used to identify inter-track interference (ITI) that may be produced by the track adjacent to the track of interest but outside of the span of the first reader. As such, employing the sampling and shaping techniques set forth in the present disclosure, the outer (or inner) track being read by the first reader that is adjacent to the inner (or outer) track being read by the second reader may be isolated, and the detection and cancellation of ITI may be improved using signal from the second reader.

When the recording head is in between the extremes and the MD, the first reader and the second reader may have spans that overlap at a single track. As such, the signal from the second reader may be used to improve or verify detection of the same track isolated from the signal detected by the first reader. Alternatively or in addition, the signal from the second reader may be used to isolate a track that is adjacent to the track isolated from the signal detected by the first reader, which may be utilized for improved detection and cancellation of ITI.

Although FIG. 4 shows the specific case of a two reader staggered bits magnetic recording architecture in full stroke, it will be appreciated that the precepts set forth herein may be applied to architectures that include more than two readers and to drives using less than a full stroke, as well as to zero-skew mechanical designs.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for reading bits recorded on magnetic media according to a staggered bits recording pattern having tracks of bits, the bits of each track being staggered relative to the bits of adjacent tracks, the method comprising:
    reading a combined signal from two or more adjacent tracks of bits, the adjacent tracks having bits arranged such that each border between adjacent bits on the same first track is positioned at or near a center position of a bit in a down-track direction on an adjacent second track, the combined signal being read at each of a plurality of sampling locations along the tracks;
    isolating one of the two or more adjacent tracks using a signal shaping algorithm selected for the plurality of sampling locations; and
    decoding the bits of the isolated track.

2. The method of claim 1, wherein the sampling locations are evenly distributed in the down-track direction and positioned at the center position of each bit on the two adjacent tracks of bits.

3. The method of claim 2, wherein when adjacent bits on the isolated track are numbered according to a numbering convention $B_{k-2}$, $B_k$, $B_{k+2}$, and so on, the signal shaping algorithm produces an isolated track signal equal to $(2B_k-(B_{k+2}+B_{k-2}))/4$.

4. The method of claim 1, wherein the sampling locations are evenly distributed in the down-track direction and positioned mid-way between each border between two adjacent bits on the first track and each border between two adjacent bits on the second track.

5. The method of claim 4, wherein when adjacent bits on the isolated track are numbered according to a numbering convention $B_{k-2}$, $B_k$, $B_{k+2}$, and so on, the signal shaping algorithm produces an isolated track signal equal to $(B_k-B_{k-2})/2$.

6. The method of claim 1, wherein each of the bits has a bit aspect ratio of about 1:1.

7. The method of claim 1, wherein decoding the bits of the isolated track comprises using information gathered from one or more tracks adjacent to the isolated track.

8. A method for reading bits recorded on magnetic media according to a staggered bits recording pattern having tracks of bits, the bits of each track being staggered relative to the bits of adjacent tracks, the method comprising:
    reading a combined signal from two or more adjacent tracks of bits, the combined signal being read at each of a plurality of sampling locations along the tracks;
    isolating one of the two or more adjacent tracks using a signal shaping algorithm selected for the plurality of sampling locations; and
    decoding the bits of the isolated track,
    wherein the step of reading a combined signal is performed by a first reader that reads a first combined signal from a first set of two or more adjacent tracks and by a second reader that reads a second combined signal from a second set of two or more adjacent tracks, and wherein the isolated track is from the first set of two or more adjacent tracks.

9. The method of claim 8, wherein at least one of the tracks of the first set of two or more adjacent tracks is adjacent to at least one of the tracks of the second set of two or more adjacent tracks, and wherein signals gathered by the second reader are used during decoding the bits of the isolated track from the first set of two or more adjacent tracks.

10. The method of claim 9, wherein how signals gathered by the second reader are used during decoding the bits of the isolated track depends on positioning of the first reader and the second reader relative to the magnetic media.

11. A hard disk drive employing a staggered bits magnetic recording architecture, the hard disk drive comprising:
    magnetic recording media having a staggered bits pattern that includes a first track having a first sequence of data bits and a second track having a second sequence of data bits, the second track being adjacent to the first track and the second sequence of data bits being staggered relative to the first sequence of data bits;
    a reader having an effective cross-track reader width extending across at least the first track and the second track, the reader aligned to read a combined signal at a plurality of sampling locations along the first track and the second track, the sampling locations selected to facilitate isolation of a single track; and
    a read channel coupled to the reader and configured to isolate at least one of the first track and the second track using a signal shaping algorithm selected for the plurality of sampling locations, and to decode the data bits of the isolated one of the first track and the second track,
    wherein the sampling locations are evenly distributed in a down-track direction and positioned mid-way between each border between two adjacent data bits on the first track and each border between two adjacent data bits on the second track.

12. The hard disk drive of claim 11, wherein the sampling locations are evenly distributed in a down-track direction and positioned at a center position of each data bit on the first track and the second track in the down-track direction.

13. The hard disk drive of claim 12, wherein when adjacent data bits on the isolated one of the first track and the second track are numbered according to a numbering convention $B_{k-2}$, $B_k$, $B_{k+2}$, and so on, the signal shaping algorithm produces an isolated track signal equal to $(2B_k-(B_{k+2}+B_{k-2}))/4$.

14. The hard disk drive of claim 11, wherein when adjacent data bits on the isolated track are numbered according to a numbering convention $B_{k-2}$, $B_k$, $B_{k+2}$, and so on, the signal shaping algorithm produces an isolated track signal equal to $(B_k-B_{k-2})/2$.

15. The hard disk drive of claim 11, wherein each of the data bits has a bit aspect ratio of about 1:1.

16. The hard disk drive of claim 11, further comprising a secondary reader spaced apart from the reader in a down-track direction, and wherein the read channel is configured to use signals gathered by the secondary reader to decode the data bits of the isolated one of the first track and the second track.

17. The hard disk drive of claim 16, wherein how signals gathered by the secondary reader are used to decode the data bits of the isolated one of the first track and the second track depends on positioning of the reader and the secondary reader relative to the magnetic recording media.

18. The hard disk drive of claim 11, wherein the reader has a uniform read detection sensitivity over the entire effective cross-track reader width.

19. A method for reading bits recorded on magnetic media according to a staggered bits recording pattern having tracks of bits, the bits of each track having a bit aspect ratio of about 1:1 and being staggered relative to the bits of adjacent tracks, the method comprising:
reading a combined signal from two or more adjacent tracks of bits, the combined signal being read at each of a plurality of sampling locations along the tracks;
isolating one of the two or more adjacent tracks using a signal shaping algorithm selected for the plurality of sampling locations; and
decoding the bits of the isolated track.

20. A hard disk drive employing a staggered bits magnetic recording architecture, the hard disk drive comprising:
magnetic recording media having a staggered bits pattern that includes a first track having a first sequence of data bits and a second track having a second sequence of data bits, the second track being adjacent to the first track and the second sequence of data bits being staggered relative to the first sequence of data bits;
a primary reader having an effective cross-track reader width extending across at least the first track and the second track, the primary reader aligned to read a combined signal at a plurality of sampling locations along the first track and the second track, the sampling locations selected to facilitate isolation of a single track;
a secondary reader spaced apart from the primary reader in a down-track direction; and
a read channel coupled to the primary reader and secondary reader, the read channel configured to use signals gathered by the primary reader to isolate at least one of the first track and the second track using a signal shaping algorithm selected for the plurality of sampling locations, and to use signals gathered by the secondary reader to decode the data bits of the isolated one of the first track and the second track.

* * * * *